May 13, 1941.   J. T. ANDERSON ET AL   2,241,974
HIGH POWER CATHODE RAY DEVICE
Filed April 3, 1939
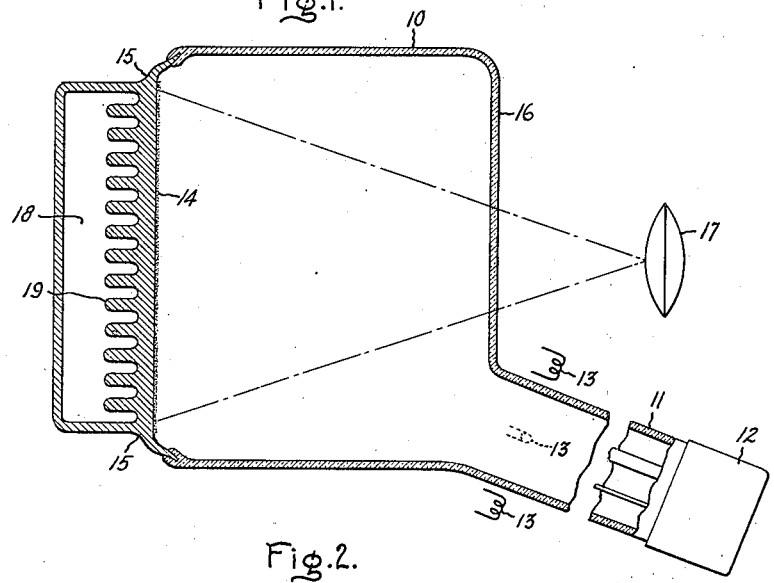
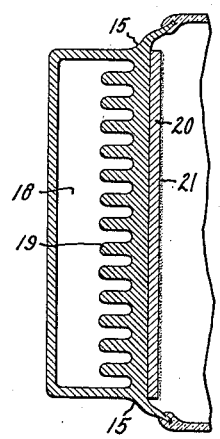
Inventors:
James T. Anderson,
Dennis Gabor,
Henry W. H. Warren,
Robert S. Wells,
by *Harry E. Dunham*
Their Attorney.

Patented May 13, 1941

2,241,974

UNITED STATES PATENT OFFICE 2,241,974

HIGH POWER CATHODE RAY DEVICE

James T. Anderson and Dennis Gabor, Rugby, Henry W. H. Warren, Coventry, and Robert S. Wells, Rugby, England, assignors to General Electric Company, a corporation of New York Application April 3, 1939, Serial No. 265,812
In Great Britain April 5, 1938

4 Claims. (Cl. 250—164)

This invention relates to cathode ray tubes and more particularly to high power cathode ray tubes suitable for projecting pictures upon large screens of a size such as those in theaters. Such screens require illuminations of the order of 10 foot candles, or 10 lumens per square foot, so that a screen which is 30 feet wide and 24 feet high requires about 7000 lumens. With luminescent screen efficiencies of the order of 25 lumens per watt and with losses of about 50 per cent in the optical projection system there is required a cathode ray tube whose capacity is of the order of 500 watts. Since projection lenses of more than 3 or 4 inches in diameter are extremely expensive it is not practical for the luminescent screen of the tube to be greater than about 4 or 5 inches in diameter. Therefore, in order to obtain the required high tube capacity it may be necessary that the power density at the luminescent screen be as high as 125 watts per square inch. However, such cathode beam intensities are higher than can be safely sustained by present-day screens. In fact, with power densities of about one-tenth of that mentioned above the life of a cathode ray tube is usually very short.

It is an object of our invention to provide a cathode ray tube with a luminescent screen which remains at a low temperature so as to be substantially free from destruction by excessive heat, when subjected to a cathode ray beam of extremely high intensity.

In one aspect of our invention, this object is accomplished by the provision of a screen which comprises a very thin layer of luminescent material backed by an artificially cooled metal electrode.

The novel features which we believe to be characteristic of our invention are set forth with particularity in the appended claims. Our invention, itself, however, both as to its organization and method of operation, together with further objects and advantages thereof, may best be understood by reference to the following description taken in connection with the accompanying drawing, in which Fig. 1 is a cross section through a cathode ray tube constructed according to our invention, and Fig. 2 is a modification of the apparatus shown in Fig. 1.

Referring to Fig. 1, a high power cathode ray tube of usual form has a glass container 10 in the neck 11 of which is located a source of cathode rays (not shown) supported by a terminal connection 12. Magnetic deflection coils 13 are arranged in the usual manner around the neck 11 to control the direction of the cathode ray beam. Electrostatic deflection plates of usual construction may be substituted therefor.

A luminescent screen 14 is deposited upon the electrode 15 which forms a wall of the cathode ray tube opposite the neck 11. The glass container 10 has a flat wall 16 opposite the screen 14. This wall 16 is designed to allow distortion-free passage of light from the screen 14 to a lens 17 which is so positioned as to project an image of the light emitted by screen 14 upon a large imaging screen (not shown). The electrode 15 has a passage 18 for cooling fluid into which project fins 19 to aid in the transfer of heat.

It is believed that an electron beam impinging on a solid surface produces heat only after the components of the beam have been slowed down to a critical range of speed. (At higher speeds the energy transformations which occur as a result of retardation of electrons results in electromagnetic radiations of higher frequency than heat.) Obviously, this low range of speed is not reached upon the first impingement of the beam upon the surface, but only after a certain penetration of the beam has sufficiently retarded the electrons.

The electrode 15 is arranged to protect the luminescent film 14 by utilization of this phenomenon. The luminescent film 14 is made thinner than the average penetration depth of the electrons, so that the beam is not retarded to the heat-producing range during passage through the film. For example, for an electron beam of 20,000 volts the thickness of film 14 should be approximately 0.003 inch. The electrode 15, on the other hand, is made of relatively great thickness so that the zone of heat production lies within its structure. As a result of this arrangement, the heat developed within the body of the electrode may be readily removed by cooling medium contained in the space 18.

The electrode 15 is preferably constituted of a metal of high heat conductivity and high heat capacity. Such metals are exemplified by copper and silver. Metals such as aluminum, magnesium, beryllium, or their alloys have high heat capacities, but rather low heat conductivities. However, these metals may be advantageous in some situations, since they do not tend to disactivate the phosphors as do heavier metals.

In the differing arrangement of Fig. 2 there is provided a metal electrode 15, identical with the similarly numbered electrode of Fig. 1. For reasons to be shortly explained, this should have high heat conductivity without regard to heat capacity. (Copper or silver are suitable metals from this standpoint.) On the face of the electrode 15 there is provided a layer of metal 20 of characteristics to be described more fully hereinafter. This layer may be deposited in any appropriate manner, for example, by vacuum distillation. Upon the metal layer 20 there is deposited a very thin layer of fluorescent material 21, identical with the layer 14 shown in Fig. 1.

The metal layer 20 is made of a low density material such as aluminum, magnesium, beryllium, or their alloys in order that the penetration depth of the electrons in this layer will be great. This places the zone of maximum heat production relatively far from the luminescent film 21. Since the heat conductivity of metal layer 20 is rather low for the metals which it is preferred to use for this layer, the layer 20 acts as an insulator between this zone and the luminescent film 21. On the other hand, since the heat capacity of the metals which it is preferred to use for this layer 20 is considerably higher than that of copper or silver, the heat generated at any point in the layer 20 will produce a comparatively small transient temperature rise. The metal of the electrode 15, because of its high heat conductivity, can readily carry away the heat generated in the layer 20.

For optimum results the thickness of the layer 20 should be such that the bombarding electrons will come to rest near the boundary between the layer 20 and the electrode 15. For example, with a beam velocity of 20,000 volts, one may appropriately use a luminescent layer thickness of about 0.003 inch in combination with an aluminum layer 20 of about 0.0001 inch. The correlation of layer thickness and materials assures that the region of maximum heat generation will be in close proximity to the electrode 15 so that effective heat transfer to that electrode is facilitated. As a further result of the correlation the insulating character of the layer 20 is permitted to function effectively in protecting the fluorescent material from overheating.

The cooling medium which flows through the passage 18 in the electrode 15 may be circulating water, which can provide a high degree of artificial cooling. It is, however, possible to use cooling by boiling water, since the loss of fluorescent efficiency which will be experienced at the temperature realized with this type of cooling will be moderate. Other media and other methods of cooling may advantageously be used as will be understood by those skilled in the art.

It may be desirable to make the surface of the electrode 15, or the surface of the metal layer 20, next to the luminescent film 21, highly reflecting. The highly reflecting surface may be engraved with a large number of closely ruled grooves, or it may be etched to expose crystal structure. Such grooving or etching provides a more intimate thermal and mechanical contact between the surface and the luminescent film deposited thereon. Any desired luminescent material may be used such as sulphide or silicate phosphors, or the like.

While we have shown particular embodiments of our invention, it will, of course, be understood that we do not wish to be limited thereto, since different modifications may be made both in the structural arrangement and instrumentalities employed, and we aim by the appended claims to cover any such modifications as fall within the true spirit and scope of our invention.

What we claim as new and desire to secure by Letters Patent of the United States, is:

1. In a cathode ray device, means for projecting a beam of electrons with a high range of velocities, a luminescent screen upon which said beam is projected comprising a film of luminescent material of less thickness than the average penetration depth of electrons bombarding said film, a backing layer supporting said luminescent film and made of metal having low heat conductivity and high heat capacity, said layer being of just sufficient thickness with respect to the average velocity of electrons in said beam so that said electrons will come to rest within the layer, a heat-dissipating support for said backing layer in intimate thermal contact therewith, said support being of material having high heat conductivity whereby the heat produced by said electrons is readily conducted away from said backing layer.

2. The combination with means for producing a beam of electrons and a luminescent film to be excited by said beam, said film being sufficiently thin to be completely penetrable by most of said electrons, of means for protecting said film from heat developed by said beam comprising a layer of conductive material comprising an element of the group including beryllium, aluminum, and magnesium, said layer having a thickness sufficient with respect to the average velocity of electrons in said beam to stop substantially all of said electrons after passage through said film within said layer in a zone adjacent the surface of said layer remote from said film, whereby the energy of said beam appears in said zone as heat, and heat dissipating means in intimate heat conducting relation with said layer adjacent to said zone for rapidly removing said heat from said layer, so that the temperature of said film is maintained low with respect to said zone.

3. The combination with means for producing a beam of electrons and a luminescent film to be excited by said beam, said film being sufficiently thin to be completely penetrable by most of said electrons, of means for protecting said film from heat developed by said beam comprising a layer of beryllium contiguous with said film on the opposite side of said film from said beam producing means, said beryllium layer having sufficient thickness with respect to the average velocity of electrons in said beam to stop substantially all of said electrons after passage through said film within said beryllium layer in a zone remote from said film and absorb the energy of said beam as heat, and heat dissipating means in intimate heat-conducting relation with said beryllium layer adjacent said zone for rapidly removing said heat therefrom.

4. In a cathode ray device, means for projecting a beam of electrons having a predetermined average velocity, a luminescent screen upon which said beam is projected comprising a film of luminous material of less thickness than the average penetration depth of electrons bombarding said film, and a composite supporting structure for said luminous film of sufficient thickness with respect to said predetermined average velocity that substantially all the energy from said beam after penetration of said film is absorbed in a zone therein as heat, said structure including a first electrically conducting portion adjacent said film having a low factor of heat conductivity and being easily penetrable by electrons whereby heat flow from said structure to said film is retarded, and a second portion remote from said film and adjacent said zone, said second portion being formed of material having high heat conductivity, whereby the heat produced by said electrons in said zone is readily conducted away from said first portion.

JAMES T. ANDERSON.
DENNIS GABOR.
HENRY W. H. WARREN.
ROBERT S. WELLS.